United States Patent [19]

Kawakami et al.

[11] Patent Number: 4,688,051

[45] Date of Patent: Aug. 18, 1987

[54] THERMAL PRINT HEAD DRIVING SYSTEM

[75] Inventors: Toshio Kawakami, Suita; Masaaki Mori, Kawasaki; Chiharu Okada, Tokyo, all of Japan

[73] Assignee: Ricoh Company, Ltd., Tokyo, Japan

[21] Appl. No.: 732,886

[22] Filed: May 8, 1985

Related U.S. Application Data

[63] Continuation-in-part of Ser. No. 523,641, Aug. 15, 1983, abandoned.

[51] Int. Cl.⁴ ........................ G01D 15/10

[52] U.S. Cl. ........................ 346/76 PH; 364/519

[58] Field of Search ........................ 400/120; 219/219 PH; 346/76 PH; 750/316.1, 317.1, 318; 358/75, 78, 298, 296; 364/518, 519

[56] References Cited

U.S. PATENT DOCUMENTS 4,071,849 1/1978 Koyano et al. ........ 346/76 PH
4,443,121 4/1984 Akai ........ 346/76 PH
4,464,669 8/1984 Sekiya et al. ........ 346/76 PH

FOREIGN PATENT DOCUMENTS 0015986 1/1982 Japan ........ 400/120
0205179 12/1982 Japan ........ 346/76 PH

*Primary Examiner*—Arthur G. Evans
*Attorney, Agent, or Firm*—Cooper, Dunham, Griffin & Moran

[57] ABSTRACT

A thermal print head driving system supplies a predetermined number of driving pulses to each of a plurality of heat-producing elements arranged in a line to record a single dot of desired tone. The pulse width of driving pulse is controlled in accordance with the temperature at or in the vicinity of the heat-producing elements thereby allowing to maintain the density level of desired tone at constant. In another aspect of the present invention, it is so structured that driving pulses may be applied to the heat-producing elements in a continuous manner without producing a cooling period during switching between tone levels. In a further aspect of the present invention, it is so structured that a predetermined number of driving pulses for each of predetermined number of tone levels is altered in consideration of the data in at least one of preceding recording lines, thereby allowing to carry out a high speed recording operation without causing fluctuations in predetermined tone density level.

17 Claims, 25 Drawing Figures

Fig. 19a

| | SPACE INFORMATION | | | | | | |
|---|---|---|---|---|---|---|---|
| DENSITY | a | b | c | d | e | f | g |
| 1 | 1 | 1 | 1 | 1 | 0 | 1 | 1 |
| 2 | 1 | 1 | 0 | 0 | 0 | 0 | 1 |
| ⋮ | ⋮ | ⋮ | ⋮ | ⋮ | ⋮ | ⋮ | ⋮ |
| 8 | 0 | 1 | 0 | 0 | 0 | 0 | 0 |

Fig. 19b

| DENSITY | NO. OF PULSES |
|---|---|
| 1 | 5 |
| 2 | 3 |
| ⋮ | ⋮ |
| 8 | 3 |

Fig. 20a

| | SPACE INFORMATION | | | | | | |
|---|---|---|---|---|---|---|---|
| DENSITY | a | b | c | d | e | f | g |
| 0 | 0 | 1 | 1 | 0 | 0 | 0 | 1 |
| 1 | 1 | 1 | 1 | 1 | 0 | 1 | 1 |
| 2 | 1 | 1 | 0 | 0 | 0 | 0 | 1 |
| ⋮ | ⋮ | ⋮ | ⋮ | ⋮ | ⋮ | ⋮ | ⋮ |
| 8 | 0 | 1 | 0 | 0 | 0 | 0 | 0 |

Fig. 20b

| DENSITY | NO. OF PULSES |
|---|---|
| 0 | 2 |
| 1 | 3 |
| 2 | 3 |
| ⋮ | ⋮ |
| 8 | 3 |

Fig. 21

| | a' | b' | c' | d' |
|---|---|---|---|---|
| m | 1 | 1 | 0 | 0 |
| $\overline{m}$ | 0 | 0 | 1 | 1 |
| $\overline{m} \cdot n$ | 0 | 0 | 1 | 0 |
| n | 1 | 0 | 1 | 0 |

THERMAL PRINT HEAD DRIVING SYSTEM

CROSS-REFERENCES TO THE RELATED APPLICATIONS

This is a CIP of U.S.S.N. 06/523,641 filed on Aug. 15, 1983, now abandoned.

BACKGROUND OF THE INVENTION

1. Field of the Invention

This invention generally relates to a driving system of a thermal print head for use in a thermal recording device which is widely used as an output device of various terminal machines such as printers, copiers and facsimile machines. More in particular, this invention relates to a driving system for driving a thermal print head including a plurality of heat-producing elements, which are selectively driven by an electrical image signal to "burn" heat-sensitive paper or tape selectively to form a visual image directly on the heat-sensitive paper or on a recording medium such as plain paper through the heat-sensitive tape.

2. Background of the Invention

Thermal recording devices are well known in the art. In a typical thermal recording device, a sheet of heat-sensitive paper is moved in contact with a thermal print head provided with a plurality of electrically resistive or heat-producing elements arranged in a line, and driving currents are selectively supplied to the resistive elements by a driving circuit connected thereto in accordance with an image signal. The resistive elements produce heat when driving currents are supplied thereto, and the heat thus produced is applied to the heat-sensitive paper to form "burn" or dark spots thereby forming a reproduced image in the form of dot matrix.

In such thermal recording devices, quality of recorded image and resolution are primarily determined by the temperature of each heat-producing element at the time or recording operation, and fluctuations in temperature would cause irregularities in density of resulting image. Under the circumstances, in order to obtain a recorded image of high quality, it is necessary to maintain the temperature of the heat-producing elements within a predetermined range during recording operation.

Various approaches have been proposed to carry out thermal recording operation so as to obtain a recorded image of high quality without irregularities in density. In one such approach, temperature in the vicinity of a thermal array comprised of heat-producing elements is detected, and the level of a driving current to be selectively supplied to the heat-producing elements is varied in accordance with the detected temperature. In another approach, the pulse width of the driving current or the current flowing time is controlled in accordance with the detected temperature. In a further approach, the frequency of the driving current is varied in accordance with the detected temperature. It has also been proposed to provide a driving current signal comprised of a plurality of current pulses of fixed pulse width for recording a single dot or picture element and to control the number of such current pulses so as to maintain the heat-producing elements at desired temperature during recording operation.

However, these prior art approaches are not always satisfactory even in the case of a binary or black-and-white recording system because the temperature of the heat-producing elements is also affected by the ambient thermal conditions, such as temperature of the ambient, and heat accumulation phenomenon. Furthermore, in the case of half-tone or gray-scale recording, since the density at each tone level must be reproduced faithfully as much as possible, temperature of the heat-producing elements during recording operation is required to be controlled much more stringently.

FIG. 1 is a graph showing a characteristic curve of recording density or density of an image formed on heat-sensitive paper by "burning" as a function of temperature of the heat-producing elements or current flowing time through the heat-producing elements. In the graph, $t_1$ through $t_4$ in the abscissa indicate current flowing time periods while current is supplied to the heat-producing elements and #1 through #4 in the ordinate indicate density levels of four different tones. In the case of FIG. 1, the time period during which a driving current of fixed magnitude is supplied to each heat-producing element is controlled to carry out half-tone recording at four different tone levels #1 through #4. For tone level #1, current flow time $t_1$ is selected. Similarly, for tone levels #2, #3 and #4, current flow times $t_1+t_2$, $t_1+t_2+t_3$ and $t_1+t_2+t_3+t_4$ are selected, respectively.

Accordingly, by controlling the current flowing period in four steps between $t_1$ and $t_1+t_2+t_3+t_4$, density of a recorded image may be changed in four levels #1 through #4. As is obvious from FIG. 1, since the curve is nonlinear, periods $t_1$ through $t_4$ are not equal in length when the total density level is equally divided into four parts.

FIG. 2 illustrates the case in which half-tone recording is carried out with four different tone levels using a direct-drive type thermal print head provided with a data buffer capable of storing data for a single line. In the timing chart of FIG. 2, there is shown a relation between transfer of data to be recorded and current pulse or current flowing time period. In the case when half-tone recording is to be carried out with the use of a direct-drive type thermal print head, as data for #1 tone, the data for all of the dots for tones ]1 through #4 are, for example, given the logic "1." Similarly, as data for #2 tone, the data for all of the dots for tones #2 through #4 are given "1", and as data for #3 tone, the data for all of the dots for tones #3 and #4 are given "1". Finally, as data for #4 tone, the data of only those dots corresponding to the density of #4 tone are given "1".

FIG. 3 is a graph showing, as an example, the relation between the current flow time and temperature of heat-producing elements when half-tone recording is carried out as illustrated in FIG. 2. In the case of a direct-drive type thermal print head, data are inputted serially, so that upon completion of inputting of data for a single line, a strobe signal is applied to control the supply of current to the heat-producing elements. In the case of carrying out half-tone recording operation in such a structure, transfer of data and supply of current are implemented for each tone level, and such an operation is repeated over the number of tones to complete recording of a single line.

In this manner, in the case of half-tone recording, since transfer of data and supply of current for a time period corresponding to associated tone are repetitively carried out for each of the four different tones #1 through #4, the temperature of the heat-producing elements vary as indicated in FIG. 3. That is, since current is not supplied during transfer of data, there exists a cooling period which corresponds to the data transfer period. This tends to deteriorate thermal efficiency of the heat-producing elements. As a result, it is necessary to increase a current flowing time period so as to compensate cooling during data transfer. It is also to be noted that the presence of data transfer period can be a cause of low recording speed.

Therefore, in the case of carrying out half-tone recording with the use of a direct-drive type thermal print head provided with a data buffer memory capable of storing data for a single line, the larger the number of tone levels, the longer the recording time. Moreover, because of the presence of a cooling period associated with data transfer, temperature rise of the heat-producing elements becomes discontinuous, which necessarily complicates control for compensating temperature fluctuations of the ambient and temperature rise due to heat accumulation, so that a faithful reproduction of half-tone image using a thermal print head becomes extremely difficult.

SUMMARY OF THE INVENTION

The disadvantages of the prior art are overcome with the present invention and an improved system for driving a thermal print head fast in operation and excellent in half-tone reproduction is provided. In accordance with one aspect of the present invention, there is provided a thermal print head driving system which supplies a plurality of current pulses to each heat-producing element in order to record a single dot or picture element and the number of such current pulses is controlled to provide a desired tone density level and at the same time the period or pulse width of such current pulses is controlled to compensate for temperature fluctuations due to temperature changes of the ambient. In accordance with another aspect of the present invention, there is provided a structure capable of preventing the occurrence of discontinuities between the above-mentioned current pulses even if the level of tone density is varied, thereby allowing to obtain a smooth temperature rise and fast recording operation. In accordance with a further aspect of the present invention, there is provided a novel half-tone recording system in which residual heat due to the recording operation for the previous line is taken into account in carrying out the recording operation for the next following line.

Therefore, it is a primary object of the present invention to provide an improved thermal recording apparatus.

Another object of the present invention is to provide a thermal recording apparatus capable of carrying out improved half-tone recording operation.

A further object of the present invention is to provide a temperature-compensated thermal recording apparatus capable of reproducing half-tone images of excellent quality.

A still further object of the present invention is to provide a thermal recording apparatus fast in operation.

A still further object of the present invention is to provide an improved system for driving a thermal print head.

Other objects, advantages and novel features of the present invention will become apparent from the following detailed description of the invention when considered in conjunction with the accompanying drawings.

BRIEF DESCRIPTION OF THE DRAWINGS

FIGS. 19*a* and 19*b* are schematic illustrations showing the tables which may be stored in RAM 23 and ROM 29, respectively, in accordance with the conventional thermal print head driving system;

FIGS. 20*a* and 20*b* are schematic illustrations showing the tables which may be stored in RAM 23 and ROM 29, respectively, of the present themal print head driving system of FIG. 18; and FIG. 21 is a schematic illustration which is useful in explaining the operation of the system shown in FIG. 18.

DESCRIPTION OF THE PREFERRED EMBODIMENTS

Figure 4:
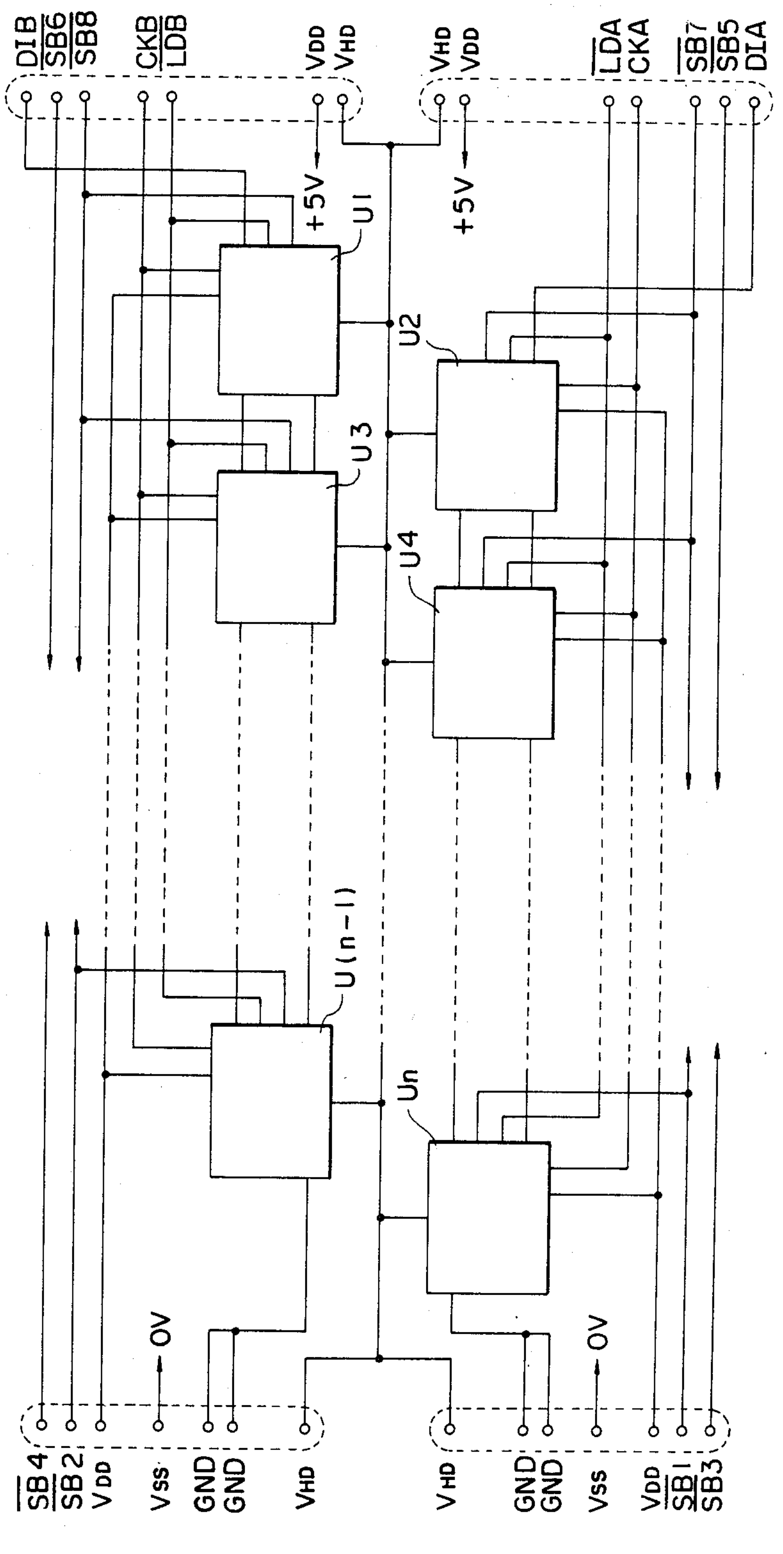
FIG. 4 is a schematic illustration showing the overall structure of a direct-drive type thermal print head to which the present invention may be suitably applied and which includes data buffer memories capable of storing data for two lines.

FIG. 4 schematically illustrates the overall structure of a direct-drive type thermal print head including shift registers, to which the present invention may be advantageously applied. As shown, the thermal print head includes an appropriate number of print head sections U1 thorough Un, each including 32 electrically resistive or heat-producing elements and a driving circuit for driving these elements. The head also includes terminals for receiving serial input data DIA and DIB, shift clocks CKA and CKB, load signals $\overline{LDA}$ and $\overline{LDB}$, strobe signals $\overline{SB1}$ through $\overline{SB8}$, recording voltage $V_{HD}$, and other voltages $V_{DD}$, $V_{SS}$ and GND as indicated in FIG. 4.

Figure 5:
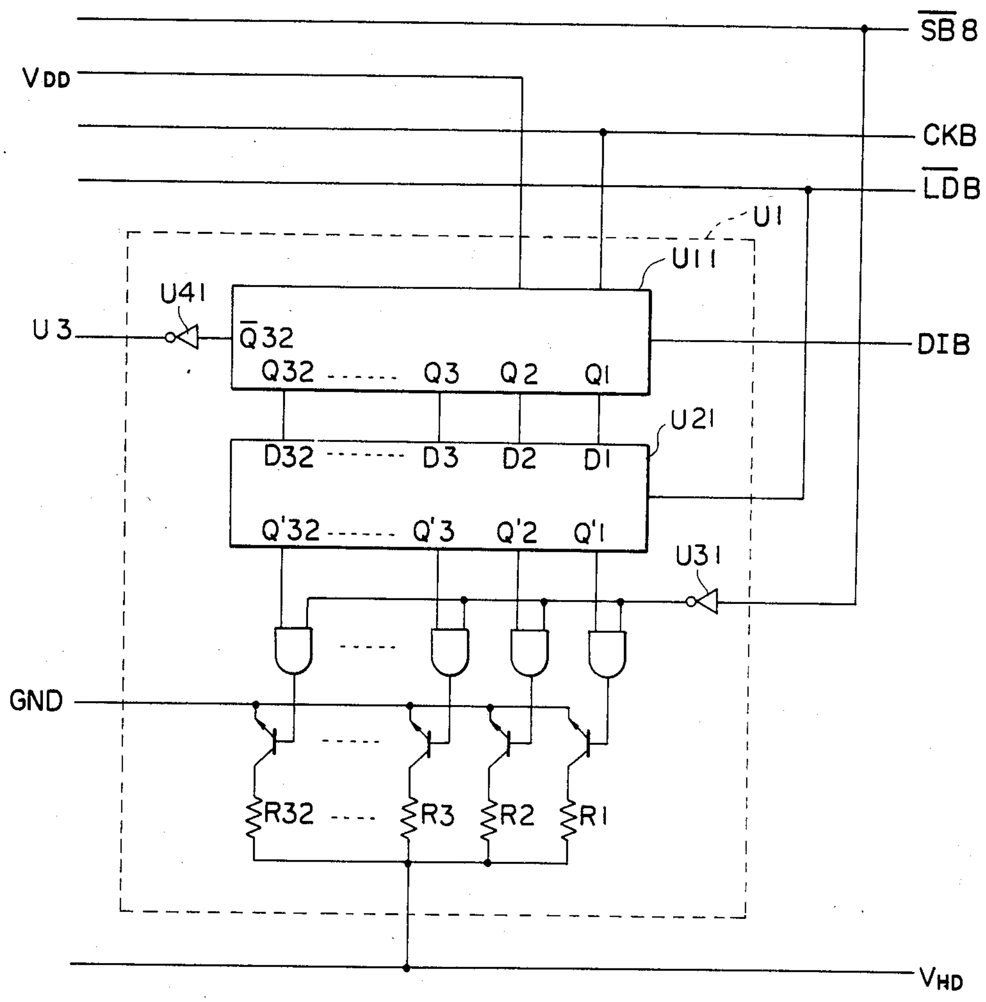
FIG. 5 is a schematic illustration showing the detailed structure of a part of the thermal print head shown in FIG. 4.

FIG. 5 schematically illustrates the detailed structure of the print head section U1. As shown, the print head section U1 includes a 32-bit shift register U11, a 32-bit latch circuit U21, inverters U31 and U41, 32 electrically resistive or heat-producing elements R1 through R32 arranged in a line spaced apart from each other, AND gates and switching transistors. It is to be noted that the other print head sections U2 through Un are similarly structured.

The shift register U11 has a 32-bit structure in correspondence with the number of the resistive elements R1–R32 and is of the serial-in-parallel-out type. And thus data to be recorded are serially supplied into the shift register U11, which supplies its output in the form of parallel data to be loaded into the 32-bit latch circuit U21. The outputs of the latch circuit U21 are connected to respective inputs of the AND gates, which selectively activate the switching transistors thereby controlling the flow of current to each of the resistive elements R1 through R32. With such a structure, since the shift register U11 and the latch circuit U21 are provided, serial input operation of data into the shift register U11 and the control of current supply to the resistive elements in accordance with the data latched into the latch circuit U21 may be carried out in parallel.

As mentioned before, the thermal print head of FIG. 4 includes n number of print head sections as shown in FIG. 5, and, thus, it can record one line comprised of 32×n dots. Incidentally, although the print head sections U1–Un are shown as arranged in staggered format in FIG. 4, all of the resistive elements are arranged, in fact, in a straight line.

Figure 6:
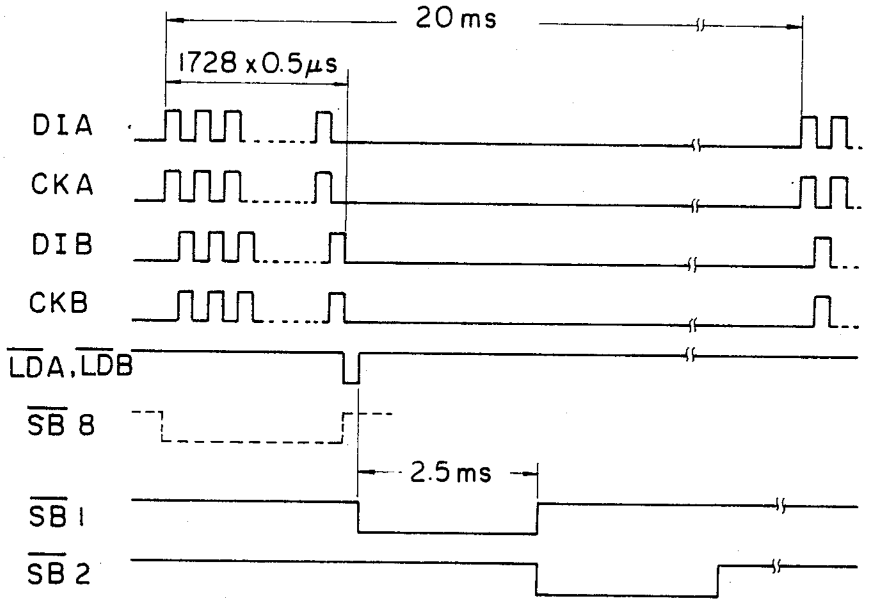
FIG. 6 is a timing chart which is useful in understanding the operation of the thermal print head shown in FIG. 4.

FIG. 6 is a timing chart showing, as an example, several signals which may be applied to the structure of FIG. 4 to drive in one mode. It is to be noted that the nomenclature employed in FIG. 6 corresponds to that of FIG. 4. It is also to be noted that although illustrated in a simplified format in FIG. 6, a single pulse shown in DIA, DIB, CKA and CKB is, in fact, a group of 32 pulses. In the case of DIA and DIB, a data for a black dot is indicated by "1" and a data for a white dot is indicated by "0", and, thus, if there exist 32 black dot data in succession, a chain of 32 pulses is formed. However, if there is one or more white dot data, there will be no pulses corresponding thereto because white dot data are indicated by low level signals or absence of pulses.

Data to be used for recording along a single line are serially supplied into channels A and B alternately every 32 bits. That is, these data are supplied into the structure of FIG. 4 as input data DIA and DIB as indicated in FIG. 6. These input data DIA and DIB are first serially supplied into the shift registers U12 and U11 of head sections U2 and U1, respectively, in synchronism with clock pulses CKA and CKB, and, then, all of the shift registers of head sections Un through U1 are eventually supplied with data for a single line. If a single scanning line consists of 1,728 bits or picture elements, each of the input data DIA and DIB includes 864 bits which are stored into the shift registers 32 bits for each of the corresponding channel.

Upon completion of transfer of data for a single line as described above, the data now stored in the shift registers U11 through U1n are then transferred to the latch circuits U21 through U2n in parallel in association with load signals $\overline{LDA}$ and $\overline{LDB}$ which are supplied as indicated in FIG. 6. In the present case, the print head sections U1–Un are previously divided into eight blocks, each of which is separately driven by the corresponding one of eight strobe signals $\overline{SB1}$–$\overline{SB8}$ as shown in FIG. 6. Accordingly, the resistive elements R1–R32xn are driven in a time-sharing mode in accordance with the data stored in the latch circuits.

Of importance, after transfer of data to the corresponding latch circuit, the shift register may receive data irrespective of the driving operation of the resistive elements or the condition of strobe signals $\overline{SB1}$–$\overline{SB8}$. Thus, upon completion of transfer of data to the corresponding latch circuit, data for the next following line may be supplied into the shift register. In this manner, since data of the next following line may be supplied into the shift registers serially while driving of the resistive elements is being carried out in accordance with the data stored in the latch circuits, the above-described structure allows to carry out a high speed recording operation.

Figure 1:
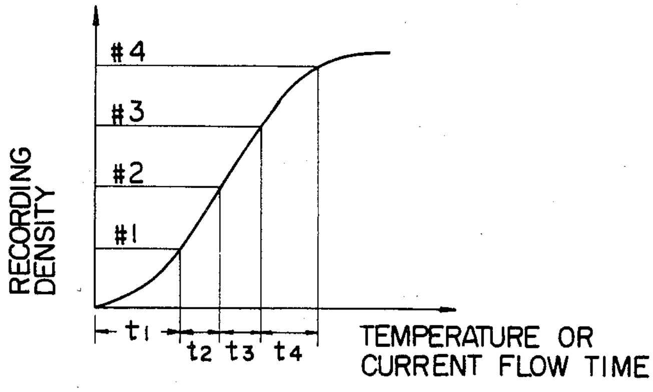
FIG. 1 is a graph showing the density of an image formed on an ordinary recording medium such as heat-sensitive paper and the temperature of or current flow time through the heat-producing elements.

Under the circumstances, in accordance with one aspect of the present invention, there is provided a structure in which the number of driving current pulses to be applied to each of the resistive elements is previously determined in correspondence with a desired tone level, and the number of driving current pulses is controlled to adjust the current flow time during which driving current is applied to each of the resistive elements thereby allowing to obtain a desired temperature in correspondence with the selected tone level shown in FIG. 1; moreover, the pulse width of each driving current pulse is controlled in correspondence with changes in the surrounding conditions thereby allowing to maintain the density of the same tone level at constant at all times.

Figure 7:
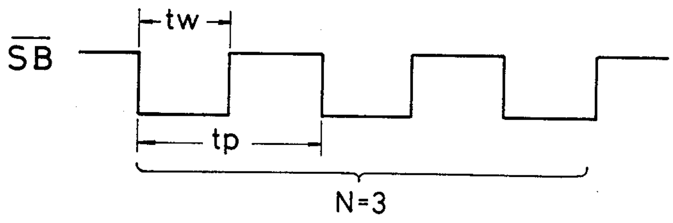
FIG. 7 is a waveform diagram illustrating an example of the waveform of a strobe signal for use in the half-tone recording system of the present invention.
Figure 8:
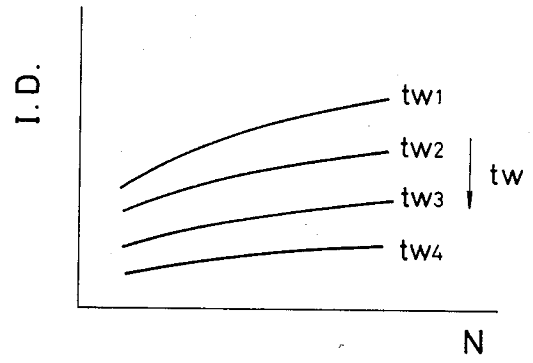
FIG. 8 is a graph showing several curves between the number N of dirving current pulses and the density I.D. of an image formed on a recording medium with the pulse width $t_w$ as a parameter when the pulse width $t_w$ is maintained at 50% duty cycle of the period $t_p$ of driving current pulse.

FIG. 7 illustrates an example of strobe signal $\overline{SB}$ which may be used in the present half-tone thermal recording system. In FIG. 7, $t_w$ indicates the pulse width of current signal, $t_p$ indicates a period or cycle of current signal and N indicates the number of current pulse signals. The particular example shown in FIG. 7 is the case where three current pulses are used to obtain the density of a certain tone level. In this manner, in accordance with the present embodiment, the number of current pulses is previously determined for the density of each of the above-described tone levels 1–4. Although the number N of current pulses is maintained at constant, their pulse width $t_w$ changes due, for example, to fluctuations in ambient temperature, heat accumulation phenomenon, etc. This may be best explained by reference to FIG. 8 which graphically shows the tendency of increase in density I.D. of reproduced image as a function of number N of current pulses. Four different curves are shown in FIG. 8 for different pulse widths $t_{w1}$ $-t_{w4}$.

Figure 9:
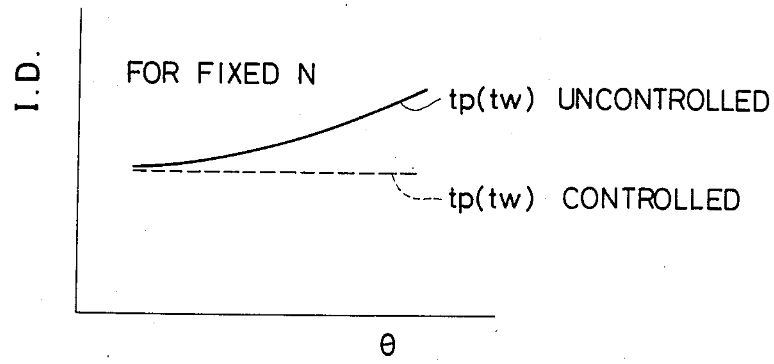
FIG. 9 is a graph showing the relation between the recording temperature $\theta$ and the image density I.D. of reproduced image which is useful in explaining the control over the period $t_p$ or pulse width $t_w$ in half-tone recording in accordance with one embodiment of the present invention.

FIG. 9 graphically shows the principle of operation of the present half-tone thermal recording system in which the abscissa is taken for the temperature $\theta$ of the resistive element and the ordinate is taken for the image density I.D. of reproduced image. That is, even if the number of current pulses for the density of a particular tone level is maintained at constant, the density of a recorded image varies under the influence of ambient temperature and other factors, so that the same density may not result for the same tone level unless period $t_p$ or pulse withd $t_w$ is properly controlled. Under the condition, in accordance with the present half-tone thermal recording system, the pulse width $t_w$ or period $t_p$ of current pulse is adjusted in accordance with changes in the surrounding conditions such as ambient temperature. As indicated in FIG. 9, for fixed number N of current pulses, since the density of reproduced image increases as the temperature increases, the density of each of the tone levels may be maintained at constant at all times by taking this into consideration. Strictly speaking, the curve shown in FIG. 9 slightly shifts according to the number N of current pulses; however, no practical problem will be arisen even if use is made of a single curve as an approximation.

It should also be noted that, as a method for controlling the pulse width $t_w$, either the pulse width $t_w$ may be made smaller in reverse proportion to an increase in temperature while maintaining the period $t_p$ at constant, or the pulse width $t_w$ may be changed while maintaining the non-current flow period ($t_p$-$t_w$) at constant. Although some numerical differences will result depending upon which of the two methods is used, the present system works equally well with either of the two. In the preferred embodiment, pulse width $t_w$ is maintained at 50% duty of period $t_p$ and $t_w$ is changed by changing $t_p$.

Figure 10A:
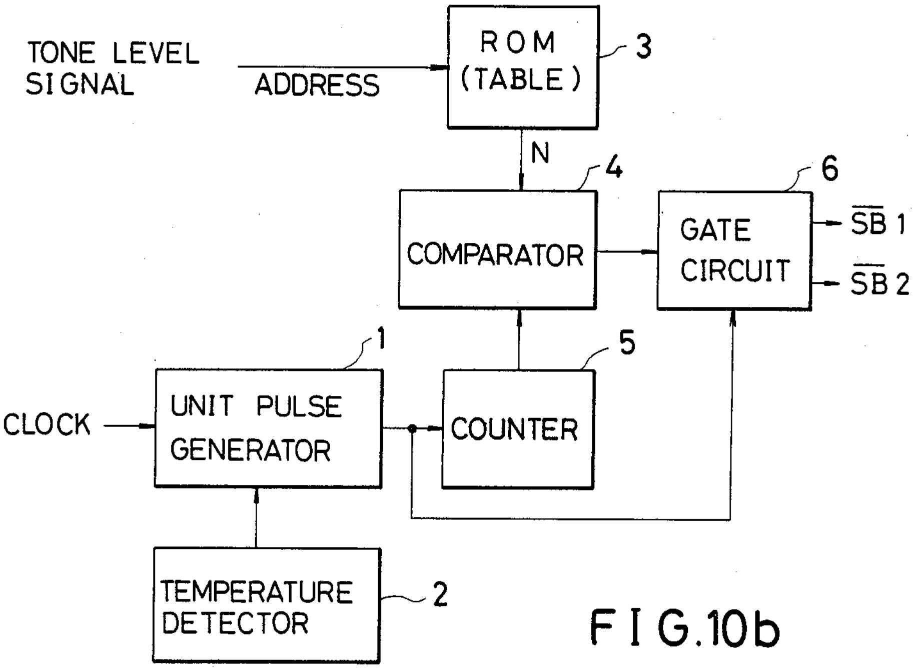
FIG. 10*a* is a block diagram showing the thermal print head driving system constructed in accordance with one embodiment of the present invention for producing a strobe signal for use in half-tone recording operation.

FIG. 10*a* is a block diagram illustrating the driving circuit for producing a strobe pulse signal for use in the present half-tone thermal recording system. The circuit includes a unit pulse generator 1, a temperature detector 2, a ROM 3 for storing therein a table associating each of tone levels with a predetermined number of current pulses, a comparator 4, a counter 5 and a gate circuit 6. As will be described in detail hereinbelow, a tone level signal and a signal indicating the temperature of resistive element are supplied as inputs to the circuit of FIG. 10 and strobe pulses $\overline{SB1}$ and $\overline{SB2}$ each having an adjusted period or pulse width are supplied as its outputs, which are then supplied to drive the resistive element.

Figure 10B:
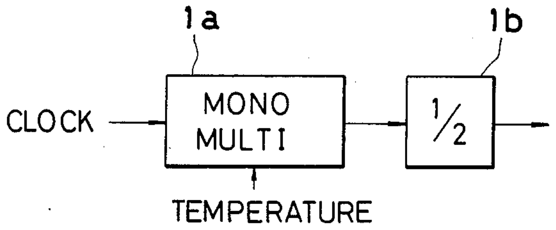
FIG. 10*b* is a blcok diagram showing the detailed structure of one embodiment of the unit pulse generator provided in the system of FIG. 10*a;*

Described in detail as to the structure shown in FIG. 10, the unit pulse generator 1 which is preferably comprised of a series connection of a monostable multivibrator 1*a* and a ½ frequency divider 1*b* as shown in FIG. 10*b*, and which supplies a unit pulse as triggered by an externally applied signal or clock in the illustrated example. An N plurality of such unit pulses define a strobe pulse $\overline{SB}$. The temperature detector 2 may, for example, be comprised of a thermister which is disposed in the vicinity of the resistive elements. A signal indicating the temperature of the resistive elements is supplied to the unit pulse generator 1, so that the period $t_p$ and thus the pulse width $t_w$ of a unit pulse may be controlled appropriately in accordance with the current temperature of the resistive elements, as indicated in FIG. 9.

As briefly mentioned before, the table in ROM 3 contains information prescribing the relation between different tone levels and number N of current pulses required for corresponding tone levels in predetermined addresses. Thus, a particular portion of ROM 3 is addressed in response to a tone level selection signal supplied thereto, and the number N of current pulses corresponding to the selected tone level is supplied as its output. The counter 5 counts the number of unit pulses supplied from the unit pulse generator 1. The comparator 4 is provided to compare the count of counter 5 with the output N from the ROM 3 and to supply a signal indicating presence or absence of coincidence between them as its output. The gate circuit 6 receives an output from the comparator as its input and the circuit 6 is disabled when the signal from the comparator 4 indicates presence of coincidence. As a result, a strobe pulse $\overline{SB}$ supplied as an output from the gate circuit 6 includes a predetermined number of pulses corresponding to a selected tone level and yet each of the pulses has an adjusted period or pulse width corresponding to the temperature conditions of the resistive elements.

In this manner, in accordance with the present half-tone recording system, half-tone density can be faithfully reproduced without being adversely affected by changes in surrounding conditions and it only requires the provision of a driving circuit which is simple in structure as shown in FIGS. 10*a* and 10*b*.

Figure 11:
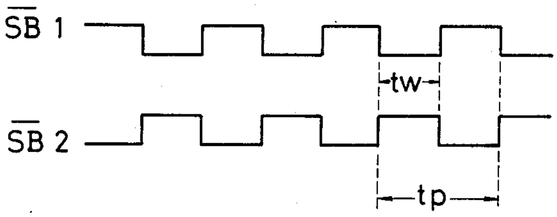
FIG. 11 is a timing chart illustrating one example of strobe signals which are employed when the thermal print head is to be driven in a time-sharing mode.

FIG. 11 is a timing chart showing a pair of strobe signals $\overline{SB1}$ and $\overline{SB2}$ which may be preferably used in the present half-tone thermal recording system when it is desired to be driven in a time-sharing mode. In this case, pulse width $t_w$ is maintained at 50% duty of period $t_p$. The example shown in FIG. 11 is a two-division driving mode, and if it is so structured that strobe signals $\overline{SB1}$ and $\overline{SB2}$ are supplied in parallel, the recording time period can be significantly reduced and a high speed recording may be envisaged. In the preferred embodiment, the period $t_p$ is set in a range from 100 microseconds to 1 millisecond.

In accordance with another aspect of the present invention, there is provided a novel driving system for driving a direct-drive type thermal print head which is provided with data buffer memory means capable of storing data for at least two lines and which is capable of printing a half-tone image, which is structured such that data transfer operation and resistive element activating operation are carried out in parallel thereby allowing to supply driving current to the resistive element continuously without a cooling period until a predetermined temperature of selected tone level is reached, which permits to obtain a recorded image of high quality due to increase in recording operation and accuracy in temperature compensation. Stated more in detail, in accordance with this aspect of the present invention, provision is made of a data transfer control means which controls the timing of parallel transfer of line data in response to a current flow time signal which is previously determined for each of tone levels. And, line data at a selected tone level are sequentially supplied into the shift registers forming a data buffer for a single line and the line data thus stored into the shift registers are transferred partially in parallel in sequence to the latch circuits forming another data buffer for a single line with the timing under the control of the data transfer control means thereby allowing to prevent the occurrence of a cooling period during the period of supplying driving current to the resistive elements selected by the data having a desired tone level. In this manner, the density of a desired half-tone level can be faithfully reproduced and furthermore a reduction in required recording time allows to carry out a high speed recording operation.

Figure 2:
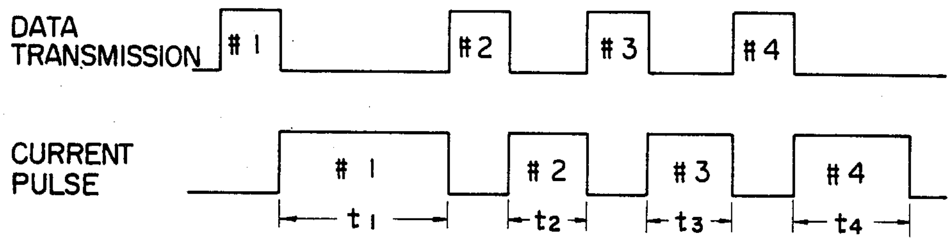
FIG. 2 is a time chart showing the relation between data transfer and current flow time ( pulse ) when half-tone recording is carried out with four different tone levels using a direct-drive type thermal print head provided with a data buffer memory capable of storing data for a single line.
Figure 3:
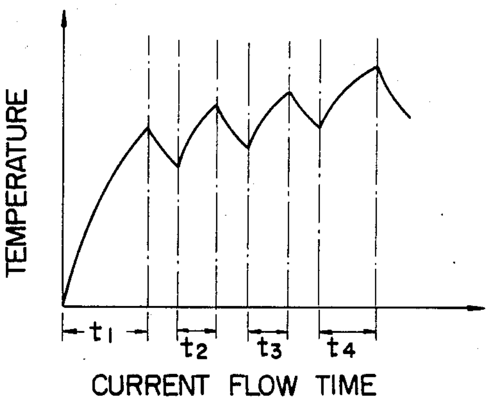
FIG. 3 is a graph showing one example of a temperature characteristic curve between the current flow time through a heat-producing element and the temperature thereof in the half-tone recording operation illustrated in FIG. 2.
Figure 12:
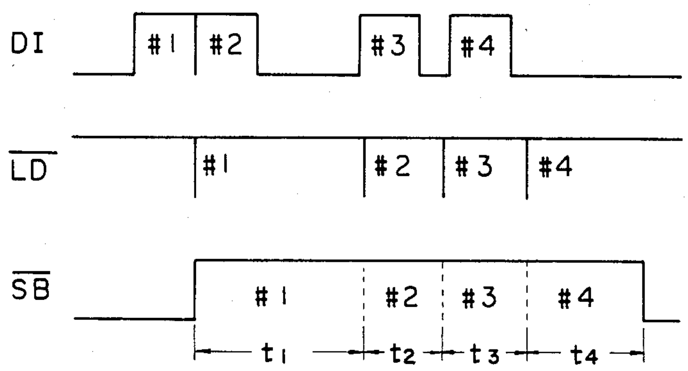
FIG. 12 is a timing chart showing the relation between the timing of data transfer and the timing of application of driving current in the thermal print head driving system constructed in accordance with another embodiment of the present invention.

FIG. 12 is a timing chart showing the relation between the timing of data transfer and activation time period of current flow time of the resistive elements in accordance with the present thermal print head driving system. In FIG. 12, DI indicates serial input data, $\overline{LD}$ indicates a load signal, and $\overline{SB}$ indicates a strobe signal. The significance of #1–#4 and $t_1$–$t_4$ is the same as that explained with reference to FIGS. 1 and 2. With this structure, serial input of data for each of the tone levels #1–#4 into the shift registers of the thermal print head shown in FIGS. 4 and 5 is carried out with the timing of signal DI of FIG. 12, and after having loaded the data in parallel into the latch circuits from the shift registers with the timing of #1–#4 of signal $\overline{LD}$, driving current is passed through the resistive elements selectively in accordance with the data for a time period $t_1$–$t_4$ of $\overline{SB}$ for each tone level.

That is, in the first place, as shown by DI of FIG. 6, the line data for tone level #1 are supplied into the shift registers serially, which are then loaded in parallel into the latch circuits with the timing of #1 of $\overline{LD}$. At the same time, a strobe signal is generated for a time period $t_1$ in response to #1 of $\overline{SB}$, and, thus, the driving current is passed through the resistive elements selectively in accordance with the data for #1 tone level which are now latched in the latch circuits. On the other hand, the shift registers are set in the condition which allows to receive new data at the time when the data for #1 tone level has been transferred in parallel with the timing of #1 of $\overline{LD}$, so that serial input of the next data for #2 tone level may be initiated at this time.

Thereafter, upon completion of activation time period $t_1$ for the data of #1 tone level, the next data of #2 tone level are loaded into the latch circuits at the timing of #2 of $\overline{LD}$, and, at the same time, the resistive elements are selectively activated in accordance with the data of #2 tone level for a time period of $t_2$ indicated by #2 of strobe signal $\overline{SB}$. Also in this case, as shown by #3 of DI, the data of #3 tone level are serially supplied into the shift registers. The similar operation follows subsequently; that is, upon completion of activation time period $t_2$ for the data of #2 tone level, the data of #3 tone level are loaded into the latch circuits and the resistive elements are selectively activated in accordance with the data in the latch circuits for a time period $t_3$ indicated by #3 in $\overline{SB}$.

Figure 13:
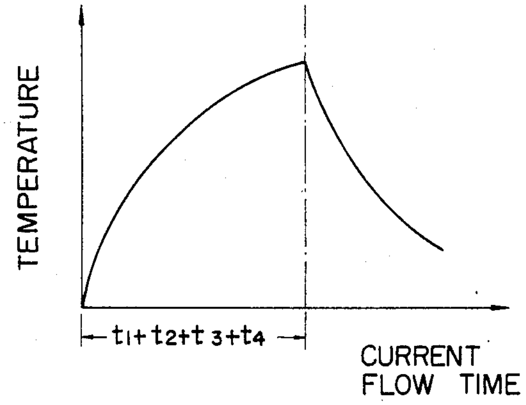
FIG. 13 is a graph showing a characteristic curve between the current flow time and temperature of the heat-producing element when the thermal print head is driven by the signals shown in FIG. 12.

Upon completion of activation time period $t_3$, the data of #4 tone level are loaded into the latch circuits from the shift registers at the timing of #4 of $\overline{LD}$ and the resistive elements are selectively activated by receiving driving current in accordance with the data in the latch circuits for a time period $t_4$ indicated by #4 in $\overline{SB}$. Upon termination of time period $t_4$, half-tone recording for a single line for four different tone levels #1–#4 is completed. The relation between the activation or current flow time and the recording density is similar to that of FIG. 1, but the activation time for $(t_1+t_2)$ through $(t_1+t_2+t_3+t_4)$ corresponding to tone levels #2 through #4 in the present case occurs continuously. FIG. 13 is a graph showing the relation between current flow time and temperature when the resistive elements of the thermal print head are driven as indicated in FIG. 12.

As described above, in accordance with the present driving system, since the resistive elements are driven by $\overline{SB}$ shown in FIG. 6, no cooling period exists during the overall activation time period $t_1$–$t_4$. As a result, no irregularities or ups and downs are present in the temperature rise characteristics of the resistive elements, as graphically shown in FIG. 13. With such a structure, the time for transferring data into the shift registers may be significantly reduced, and since driving current is continuously supplied to selected resistive elements without occurring a cooling period, temperature control for density compensation can be carried out extremely with ease.

In the case where the tone levels of recording density in FIG. 1 are more finely divided, there is a possibility in which the current flow time for one tone level ($t_1$–$t_4$ of $\overline{SB}$ in FIG. 6) becomes shorter than the time required for transfer of data ( #1–#4 of DI in FIG. 6 ). In such a case, since the supply of next current cannot be initiated until termination of the data transmission for a single line, it may be so structured that the minimum current flow time for each of the tone levels does not become smaller than the time required to carry out data transmission, for example, by making the temperature rise characteristic of the resistive elements slower by adjusting an applied voltage, etc.

Figure 14A:
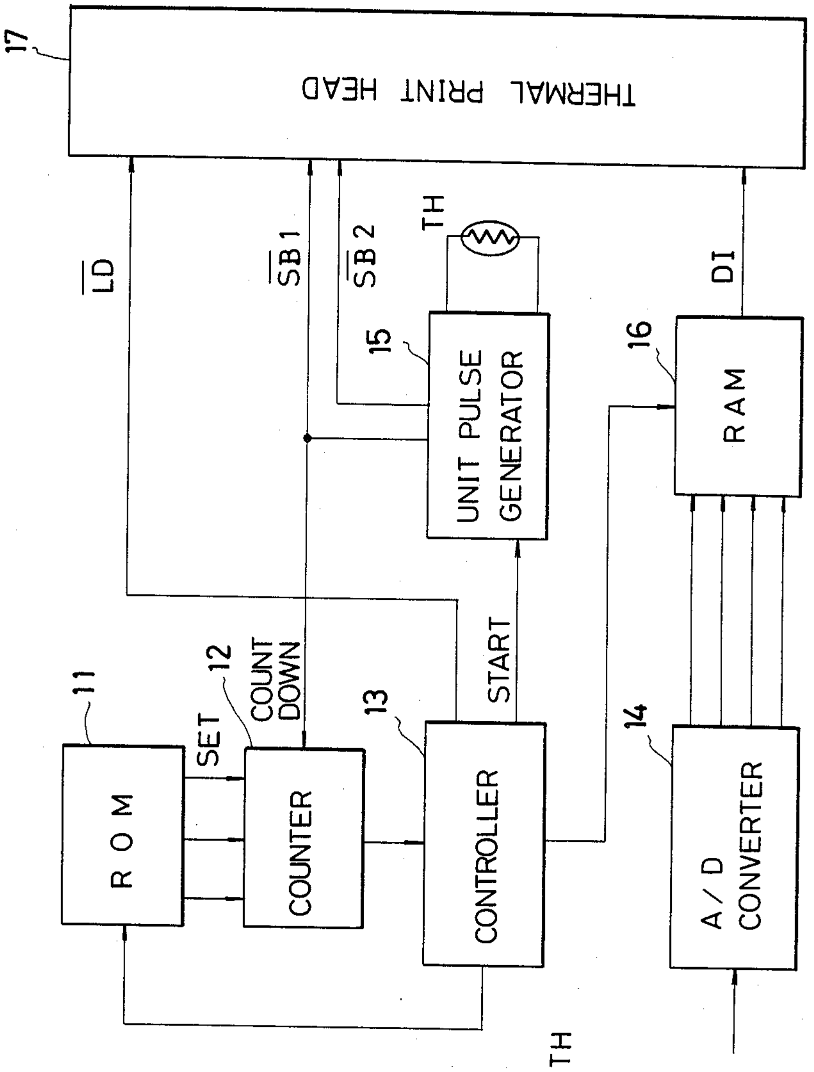
FIG. 14*a* is a block diagram showing the thermal print head driving system constructed in accordance with another embodiment of the present invention.
Figure 14B:
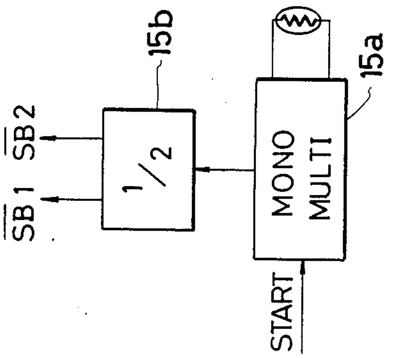
FIG. 14*b* is a block diagram showing the detailed structure of one embodiment of the unit pulse generator provided in the system of FIG. 14*a;*

FIG. 14*a* is a block diagram showing the present thermal print head driving system constructed in accordance with one embodiment of the present invention. As shown, the system includes a read only memory or simply ROM 11, a counter 12, a controller 13, an A/D or analog-to-digital converter 14, a unit pulse generator 15, a random access memory or simply RAM 16, a thermal print head 17 and a thermister TH. As described before, in the driving circuit of FIG. 14*a*, a plurality of current pulses having a predetermined pulse width are supplied to the resistive elements at one tone level, and the number of such current pulses is digitally controlled so as to allow to obtain the recording density of desired half-tone level. FIG. 14*b* shows in detail the preferred embodiment of the unit pulse generator 15 provided in the system of FIG. 14*a*. As shown, in the preferred embodiment, the unit pulse generator 15 is comprised of a monomulti-vibrator 15*a* and a ½ frequency divider 15*b*.

Also as described before, the ROM 1 contains a table of information as to the relation between the number of current pulses and the tone level, such as the number N of pulses equals "1" for #1 tone level, the number N of pulses equals "2" for #2 tone level, etc. Assumption is made here that the embodiment of FIG. 14 is so structured to carry out half-tone recording with four tone levels #1–#4.

In operation, analog image information is converted into.digital image data at four different tone levels as processed through the A/D converter 14, and the thus produced image data for four different tone levels are temporarily stored into the RAM 16 line by line.

As described before with reference to FIGS. 4 and 5, the thermal print head 17 is a direct-drive type thermal print head provided with a pair of data buffers, each of which is capable of storing data for a single scanning line and comprised of shift registers or latch circuits. The print head also includes a plurality of electrically resistive elements arranged in a line spaced apart from each other, which are selectively activated in accordance with the image data loaded in the latch circuits, and such a half-tone recording operation is repetitively carried out line by line.

Figure 15:
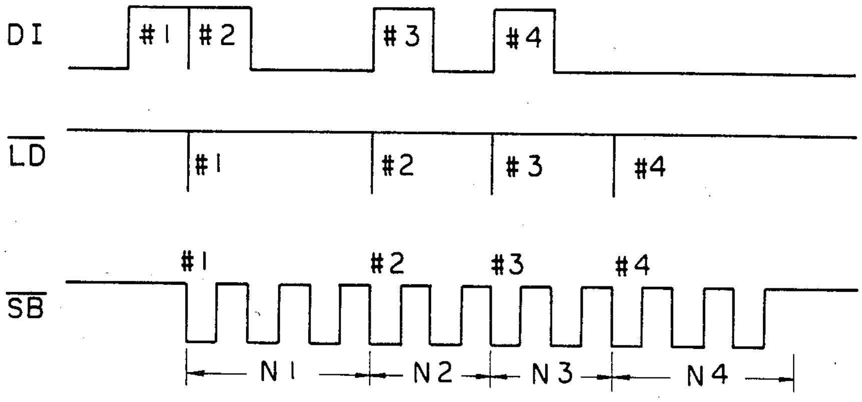
FIG. 15 is a timing chart showing the relation between serial input data DI, load signal $\overline{LD}$ and strobe signal $\overline{SB}$ for use in the driving system of FIG. 14.
Figure 16:
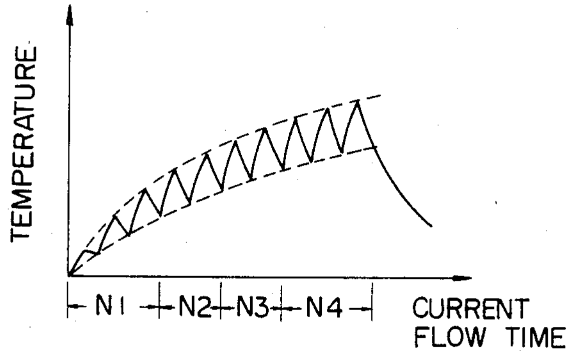
FIG. 16 is a graph showing a characteristic curve between the current flow time and temperature of the heat-producing element in the driving system of FIG. 14.

FIG. 15 is a timing chart showing the timed relation between signals DI, $\overline{LD}$ and $\overline{SB}$ which are used in the driving circuit of FIG. 14. It is to be noted that N1–N4 shown in FIG. 15 indicates the number of current pulses in each of the tone levels #1–#4. FIG. 16 is a graph showing the temperature characteristic of the driving circuit shown in FIG. 14, in which the abscissa is taken for current flow time and the ordinate is taken for temperature.

Referring again to FIG. 14a, serial input data DI, load signal $\overline{LD}$ and strobe signal $\overline{SB}$ are supplied into the thermal print head 17 at the timing shown in FIG. 15 from RAM 16, controller 13 and ROM 11, respectively, under the control of controller 13. The unit pulse generator 15 generates unit or current pulses, which are collected to form a strobe signal $\overline{SB}$. The counter 12 counts the number of pulses generated by the unit pulse generator 15.

In operation, in the first place, a command is supplied from the controller 13 to RAM 16, which then supplies the data for tone level #1 into the shift registers in the thermal print head 17 as serial data DI, and, at the same time, the number N1 of pulses for the tone level #1 stored in ROM 11 is preset in the counter 12. Then, the controller 13 supplies a load signal $\overline{LD}$ to the thermal print head 17 to have the data now present in the shift registers transferred to the latch circuits in parallel, which is followed by the application of strobe signal $\overline{SB}$.

Under the condition, the number N1 of pulses for tone level #1 thus preset in the counter 12 is decremented each time when a unit pulse is generated from the unit pulse generator 15, and the strobe signal $\overline{SB}$ is kept being generated until the count of the counter 12 becomes "0.". The similar control is carried out repetitively for the data transfer of tone levels #2–#4 and the generation of pulses N2 - N4 for strobe signal $\overline{SB}$. As a result, the temperature of each of the resistive elements increases, as shown in FIG. 16. Although the manner of increase in temperature is indicated somewhat in an exaggerated fashion in FIG. 16, it is practically equivalent to a continuous rise in temperature. It should be noted that the slope in temperature rise is not too steep so that the time period for carrying out data transfer may be sufficiently secured. Strictly speaking, a non-current flow time period is present in the temperature rise characteristic of FIG. 16 and thus there is present a cooling period; however, the effects due to such a cooling period may be disregarded as long as a plurality of current pulses are applied in a continuous manner.

Furthermore, in the driving circuit of FIGS. 14*a* and 14*b*, the thermister TH is provided to detect the surrounding temperature and supplies a density compensation signal to the unit pulse generator 15 where the period and thus the pulse width of each of the unit pulses is controlled in response to the detected temperature. It will be understood that in accordance with the present invention such a temperature control can also be carried out quite simply with the use of the above-described continuous temperature rise characteristic. It should further be noted that although the above-described description has been made mainly with respect to the case in which use is made of a sheet of heat-sensitive paper, the present invention may be equally applicable to the thermal recording system in which a reproduced image is formed on plain paper using a heat-sensitive ribbon.

Figure 17:
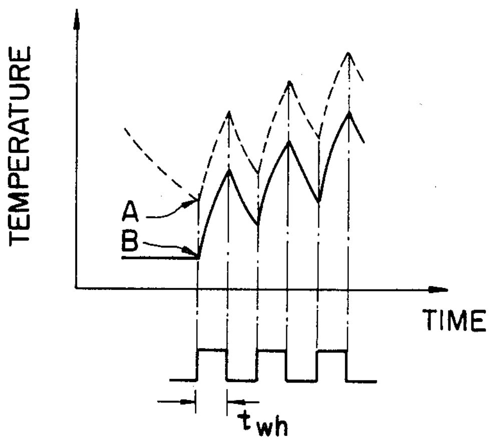
FIG. 17 is a graph showing two temperature characteristic curves when a driving current pulse having the pulse width of $t_{wh}$ is applied repetitively for two different initial temperature conditions.

In accordance with a further aspect of the present invention, there is provided a structure which allows to prevent the occurrence of density fluctuations due to thermal hysteresis at higher printing speeds such as printing frequency in the order of 10 milliseconds. Such a thermal hysteresis compensation needs to be carried out in addition to the above-described compensations for ambient temperature fluctuations when the printing speed is increased. That is, FIG. 17 is a graph showing the temperature increasing characteristic when a train of current pulses having the pulse width $t_{wh}$ are applied to the resistive elements of the thermal print head. In this example, it is assumed that the frequency of printing dots is in the order of a few milliseconds and the pulse width $t_{wh}$ is in the order of several 10*s* to several 100*s* microseconds. As in the previous cases, a plurality of pulses are used to record a single dot and the number of such pulses is varied in accordance with the density of a desired tone level.

As described previously, the slope of the temperature rising characteristic may be varied by changing the pulse width $t_{wh}$ while maintaining the period at constant or by changing the period while maintaining the duty cycle at constant. However, such a technique is good only for obtaining a desired slope in the temperature rising characteristic in FIG. 17. However, as shown in FIG. 17, the initial temperature condition of the resistive elements is not always the same, and it is particularly true when recording operation is carried out at high speed. For example, if the resistive elements are at room temperature, the temperature of resistive elements starts to rise from a point B when a plurality of driving current pulses are applied to the resistive elements. On the other hand, if the resistive elements are initially at a higher temperature level due, for example, to application of driving current pulses in the recording of the preceding line or lines, the temperature rise will start from a point A, as shown in FIG. 17. Such a symptom is pronounced at higher recording speeds.

Figure 18:
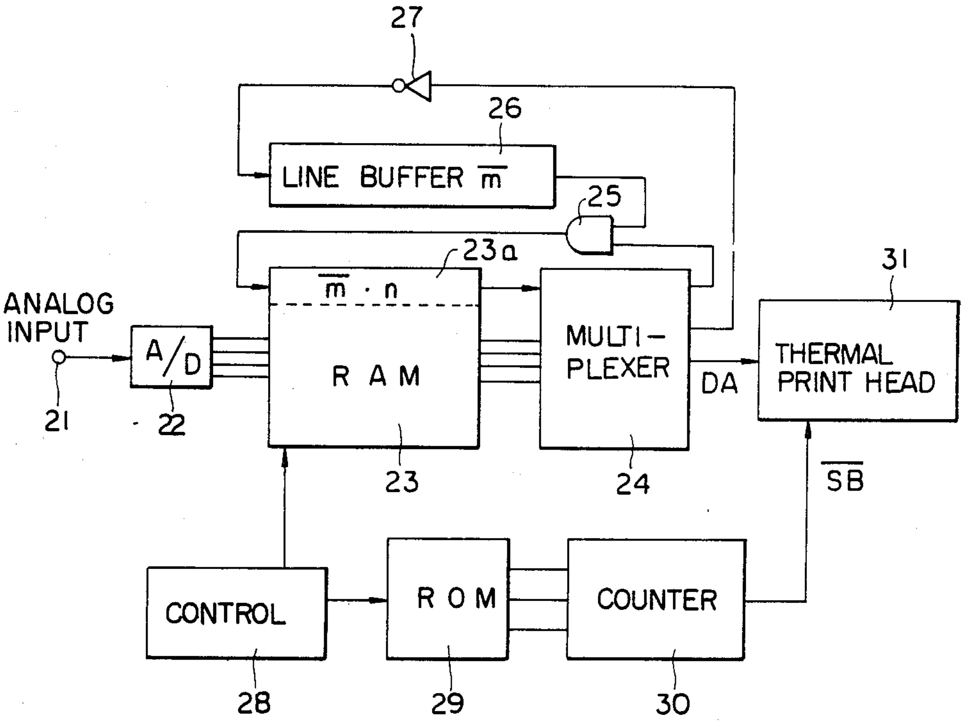
FIG. 18 is a block diagram showing the thermal print head driving system constructed in accordance with a further embodiment of the present invention, which can control the temperature of heat-producing element by taking into account the initial temperature condition of heat-producing element.

FIG. 18 is a block diagram which shows the thermal print head driving system which is particularly addressed to solve such a problem. The system includes a an input terminal 21 to which an analog image signal is supplied, an A/D converter 22 for converting an analog image signal into digital image data, a RAM 23 including a section for storing thermal hysteresis compensation data, a multiplexer 24, a ROM 29, a control 28 for controlling addressing of RAM 23 and ROM 29 and a counter 30. The present system also includes a means comprising an AND gate 25, a line buffer memory 26 and an inverter 27 for generating the thermal hystersis compensation data from the image data of the previous line and the current line.

As to the operation of the system shown in FIG. 18 for recording a half-tone image without carrying out the thermal hysteresis compensation of the present invention, when analog image information is supplied to the input terminal 21, it is converted into digital image data which are then stored into the RAM 23 in the form of a table shown in FIG. 19*a* in which the horizontal direction is taken for space information or position of each dot and the vertical direction is taken for density or tone level, eight levels in this example. Thus, the recording of each line is repeated eight times with a density level different each time to obtain a half-tone image. FIG. 19*b* is a table showing the relation between the eight density levels and the numbers of driving pulses associated therewith, which is previously stored in the ROM 29. When the data "1" is found in a particular density level for a particular dot, i.e., "a" through "g", the number of pulses corresponding to the particular density level may be selected from the table of FIG. 19*b* contained in the ROM 29. For example, supposing that the recording of density level 2 is to be carried out at a particular line, three current pulses will be applied to the dot "a" because the dot "a" has the data "1" at the density level 2 but no current pulses will be applied to the dot "c" because "0" is present for the dot "c" at density level 2. However, such a structure suffers from the above-mentioned disadvantage because no correction is made for the thermal hysteresis phenomenon.

FIGS. 20*a* and 20*b* are the tables which are stored in the RAM 23 and ROM 29, respectively, of the system shown in FIG. 18 in accordance with one embodiment of the present invention. The table of FIG. 20*a* differs from that of FIG. 19*a* in the addition of the "0" density row, which corresponds to the section 23*a* of the RAM 23 and contains data of thermal hysteresis compensation generated from the image data of the previous line m and current line n. FIG. 20*b* is a table which is stored in the ROM 29 and it differs from the table of FIG. 19*b* because the number of pulses "5" for the density level 1 in the table of FIG. 19*b* is split into the number of pulses "2" for the density level "0" and the number of pulses "3" for the density level "1" in the table of FIG. 20*b*. In the present embodiment, the data for themal hysteresis compensation are defined by a product of $\overline{m}$ and n. In this respect, as shown in FIG. 21, the thermal hysteresis compensation data, or $\overline{m}\cdot n$, becomes "1" only when the dot, or "c'" in this case, had the data "0" in the previous line m and it now has the data "1" in the current line n. Other than that, the thermal hysteresis compensation data are all "0." Accordingly, it follows that there is an effect of thermal hysteresis from the previous line at those dots which have the data "0" in the row of density level 0.

Such being the case, when the recording operation at the density level 1 is to be carried out, for those dots or resistive elements having the data "0" in the row of the density level 0 and the data "1" in the row of the density level 1, only three pulses are applied to drive the corresponding dots; on the other hand, for those dots having the data "1" in the row of the density level "0" and the data "1" in the row of the density level 1, five pulses which is the sum of the pulses in the density levels "0" and "1" in the table of FIG. 20*b* are applied to drive the corresponding dots. In this manner, a resulting recorded image can be prevented from being adversely affected by the thermal hysteresis phenomenon.

One example of generating the thermal hysteresis compensation data is that upon completion of recording a line image at line m, the data of the upper density levels, e.g., the data of density level 7 and above, are extracted from the RAM 23 through the multiplexer 24 and temporarily stored into the line buffer memory 26 through the inverter 27. Then, when the data for the nth line, e.g., the line following the line m, are supplied into the RAM 23, the data in the lower density level, e.g., density level 1 or 2, are read out through the multiplexer 24 and supplied to one input of the AND gate 25 while supplying the data temporarily stored in the line buffer memory 26 to the other input of the AND gate 25 at the same time, thereby causing its output, which is the thermal hysteresis compensation data, to be stored into the row of density level 0, which corresponds to the section 23*a* in the RAM 23. Then, data DA are supplied to the thermal print head 31 level by level and in association therewith the information as to the number of pulses is fed into the counter 30 which supplies a strobe pulse $\overline{SB}$ having corrected number of pulses to the head 31. In this manner, a half-tone image of high quality without being adversely affected by the thermal hesteresis from the recording operation for one or more previous lines can be obtained even at a high-speed recording operation. It is to be noted that as the line buffer memory 26 use may be made of one provided in the thermal print head 31.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A system for driving a thermal print head including a plurality of heat-producing elements which are selectively driven to thermally form an image on a recording medium, comprising:

means for producing driving pulses to be selectively applied to said heat-producing elements;

means for controlling the number of said driving pulses to be applied to each of selected ones of said heat-producing elements in accordance with a tone level signal, said means for controlling including a unit pulse generator for generating unit pulses each having a duty cycle of approximately 50% and a counter which receives a count corresponding to the number of said driving pulses and decrements the count each time said unit pulse generator generates a pulse applied to the selected heat producing elements;

means for detecting the temperature of a predetermined portion of said thermal print head; and means for adjusting the pulse width of said driving pulses from said means for producing driving pulses in accordance with the temperature detected by said means for detecting.

2. A system of claim 1 wherein said image is a halftone image and said tone level signal is a signal indicating the density level of a desired tone.

3. A system of claim 2 wherein said means for adjusting adjusts the pulse width of said driving pulses such that the density level of the same tone remains at constant even if the temperature of said predetermined portion fluctuates.

4. A system of claim 3 wherein said predetermined portion includes said heat-producing elements.

5. A system of claim 3 wherein said predetermined portion includes the vicinity of said heat-producing elements.

6. A system of claim 3 wherein each of said heat-producing elements includes an electrically resistive element and said driving pulses include current pulses passed through said resistive element.

7. A system of claim 2 wherein said means for producing driving pulses generates a unit pulse having a predetermined pulse width when triggered by a clock signal.

8. A system of claim 7 wherein said unit pulse generator includes a series connection of a monostable multivibrator and a ½ frequency divider maintaining the duty cycle of said unit pulse at 50%.

9. A system of claim 2 wherein said means for controlling includes a memory for storing therein information prescribing the relation between said tone level pulses and the number of driving signals.

10. A system of claim 9 wherein said tone level signal is capable of indicating a plurality of density levels each of which is related to a predetermined number of driving pulses.

11. A system for driving a thermal print head including a plurality of heat-producing elements which are selectively driven to produce heat to thereby thermally form an image on a recording medium, said thermal print head also including a first data buffer for receiving predetermined data and a second data buffer for receiving said predetermined data from said first data buffer for applying them to said heat-producing elements, said system comprising:

first storing means for storing image data at a predetermined number of tone levels;

second storing means for storing information as to the relation between said predetermined number of tone levels and an activation time period associated with each of said predetermined number of tone levels; and control means for controlling the supply of said image data from said first storing means to said first data buffer and for controlling the supply of said data from said first data buffer to said second data buffer in accordance with said activation time period supplied from said second storing means, said control means including a unit pulse generator for generating unit pulses each having a duty cycle of 50% and a counter which receives information of said activation time period in the form of number of pulses and decrements its count each time when it receives a unit pulse form said unit pulse generator, said control means supplying as its output a pair of strobe signals which are 180 degrees out of phase from each other to said thermal print head.

12. A system of claim 11 further comprising means for converting analog image information into digital image data at a predetermined number of tone levels, which are stored into said first storing means.

13. A system of claim 11 wherein said first storing means includes a RAM.

14. A system of claim 11 wherein said second storing means includes a ROM.

15. A system for driving a thermal print head including a plurality of heat-producing elements which are selectively driven to produce heat to form an image line by line on a recording medium, comprising:

first storing means for storing image data at a predetermined number of tone levels, said first storing means including a RAM; as to the second storing means for storing information relation between said predetermined number of tone levels and a predetermined number of driving pulses to be applied to each of selected ones of said heat-producing elements in association with each of said predetermined number of tone levels; and means for altering said predetermined number of driving pulses in accordance with image data at least one of preceding line, said means for altering including a part of said RAM for storing a product of the inverse of each image data in an $m^{th}$ line and the corresponding image data in an $n^{th}$ line which is subsequent to said $m^{th}$ line.

16. A system of claim 15 further comprising means for converting analog image information into digital image data at a predetermined number of tone levels, which are stored into said first storing means.

17. A system of claim 16 wherein said second storing means includes a ROM.

* * * * *